(12) United States Patent
Heitel

(10) Patent No.: US 7,114,543 B2
(45) Date of Patent: Oct. 3, 2006

(54) TOP FEED ROLLER AWNING SYSTEM

(75) Inventor: Robert G. Heitel, Laguna Beach, CA (US)

(73) Assignee: Girard Systems, San Clemente, CA (US)

( * ) Notice: Subject to any disclaimer, the term of this patent is extended or adjusted under 35 U.S.C. 154(b) by 0 days.

(21) Appl. No.: 10/863,438

(22) Filed: Jun. 8, 2004

(65) Prior Publication Data

US 2005/0022942 A1 Feb. 3, 2005

Related U.S. Application Data

(60) Provisional application No. 60/490,800, filed on Jul. 28, 2003.

(51) Int. Cl.
*E04F 10/06* (2006.01)

(52) U.S. Cl. .......................... 160/22; 160/11

(58) Field of Classification Search ................. 160/22, 160/11, 23.1, 19, 66, 67, 68, 65; 135/88.11, 135/88.12
See application file for complete search history.

(56) References Cited

U.S. PATENT DOCUMENTS

| | | | | |
|---|---|---|---|---|
| 1,033,198 A | * | 7/1912 | Saunders ..................... 160/22 |
| 2,876,471 A | * | 3/1959 | Kraemer ......................... 15/1 |
| 3,364,973 A | * | 1/1968 | Railson ....................... 160/22 |
| 3,782,443 A | * | 1/1974 | Clauss et al. ................ 160/22 |
| 3,923,074 A | * | 12/1975 | McKee ........................ 160/22 |
| 4,171,013 A | * | 10/1979 | Clark .......................... 160/22 |
| 4,469,159 A | * | 9/1984 | Lohausen ..................... 160/22 |
| 4,821,786 A | * | 4/1989 | Johnston .................... 160/23.1 |
| 5,121,782 A | * | 6/1992 | Renkhoff et al. ............. 160/22 |
| 5,285,837 A | * | 2/1994 | Pozzi ........................... 160/22 |
| 5,296,964 A | * | 3/1994 | Shopp ........................ 359/443 |
| 6,098,698 A | * | 8/2000 | King-Darr ............... 160/290.1 |
| 6,269,824 B1 | | 8/2001 | Brutsaert | |

* cited by examiner

*Primary Examiner*—David Purol
(74) *Attorney, Agent, or Firm*—Walter A. Hackler

(57) ABSTRACT

A roller awning system is provided for a recreational vehicle having a slider. The system includes a housing for mounting on an outside wall of a recreational vehicle above the slider and a roll of awning is rotatably disposed within the housing and deployable from the topside of the roll in order to establish a pitch between the topside and an extended edge of the slider. This pitch promotes a moisture and debris runoff. A cover is attached to the housing for enclosing the awning roll with the slider in a retracted position and swingable for enabling deployment of the awing as the slider is extended. A wiper is provided and disposed on the leading edge of the cover for sweeping debris from the awning when the awning is rolled during retraction of the slider.

6 Claims, 2 Drawing Sheets

TOP FEED ROLLER AWNING SYSTEM

The present application claims as priority U.S. Ser. No. 60/490,800 filed Jul. 28, 2003, which is incorporated herewith in its entirety.

The present invention is generally directed to awning assemblies for recreational vehicles having a slider extension and is more particularly directed to an awning system having a fabric feed from an upper edge of a roll with an integral brush system to sweep debris from the fabric upon roll up.

In conventional torsionally wound awning systems, the housing system remains fixed. In other words, the feed of the fabric is from the lower edge of the housing, nearest the bottom side of the roll. This fixes the pitch angle of the deployed fabric onto the "slider".

SUMMARY OF THE INVENTION

In accordance with the present invention an awning system generally includes a housing for mounting on an outside wall of a recreational vehicle above a slider extension. A roll of awning is rotatably disposed within the housing and deployable from a topside of the roll in order to establish a pitch between the roll topside and an extended edge of the slider. This pitch promotes moisture and debris runoff.

A cover is attached to the housing for enclosing the awning roll with the slider in a retracted portion and swingable for enabling deployment of the awning as the slider is extended.

A wiper is provided and disposed on a leading edge of the cover for reversing debris from the awning which the awning is rolled during retraction of the slider.

It should be appreciated that the feed of the awning fabric is from an upper edge of the roll, past a swinging front cover of the housing, in order to maintain the enhanced pitch angle of the deployed fabric onto the "slider".

This swinging front cover of the housing is an added feature in the design of the housing. Further, in order that this swinging front cover doesn't flap or bang around, when either deployed or stowed during movement of the vehicle or during high wind condition, a torsion spring or the like may be employed to bias in favor of the closed position.

Alternatively, a magnetic strike plate may be installed to aid in maintaining the closed condition. The magnitude of the needed closing torque on the front cover is far less than the magnitude of the torsionally wound awning system itself.

The present awning system is used primarily in the recreation vehicle industry to provide protection from the elements for slider extensions in recreational vehicles. A slider extension is simply a portion of the recreational vehicle's living space which, when built upon some conveying mechanism, extends laterally to provide expanded living space within that vehicle's interior.

When the slider extension is stowed or withdrawn flush to the rest of the vehicle's exterior surface, there is some form of gasket to provide a weather seal. When the slider extension is deployed or extended for use when the vehicle is parked, that seal is compromised somewhat.

In addition, the upper horizontal surface is then exposed directly to all environmental elements. Depending where the vehicle is located, tree leaves, rain, snow, etc. may fall onto that horizontal surface and lodge thereon until the "slider extension" is retracted for travel.

The awning system described herein may be a non-motorized, or a motorized torsion spring retraction system. The awning is pulled out (deployed) by the slider extension, which has enough power to overcome the retraction force imparted on the fabric cover. The fabric provides a taut, flexible roof to protect the slider extension's upper, horizontal surface from the elements.

The fabric on such an awning system is typically paid out from a torsionally wound roll of fabric. That roll can be located either on the moving slider extension or on the stationary coach body.

If the torsionally wound awning system is located on the slider extension, then that entire mechanism must travel along with the slider extension. From a cosmetic, aesthetic point of view, this can disturb the design lines and intent of the coach itself.

If the torsionally wound awning system is located on the coach body, then only the leading edge of the awning needs to travel with the slider extension. This minimizes the overhanging "mass" associated with the torsionally wound awning system. Further, the mechanisms mounted on the coach body can be blended into the vehicles profile by means of fairings and other design means.

Another key design feature of such an awning system not already mentioned, is the ability of the fabric cover to shed the elements from which it protects the "slider extension". For instance, it would be desirable, as with any roofing system, to provide a degree of pitch so that moisture could run off the awning. Further, it would be desirable to have the torsionally wound awning system be able to "sweep" off debris which could become entrapped within the windings of the fabric material, leading to subsequent staining and mildewing of such material.

In order to provide the necessary pitch, the mounting height of the fabric on the coach must be significantly higher than the top leading edge of the slider extension. For systems where the torsionally wound awning system is mounted on the coach, this means the box assembly must be mounted as high as practical. Most of the time this is impractical, since the crown radius of the coach's roof is often very close to the top of the housing itself.

In all of the systems on the market today, where the box is mounted on the coach body, the fabric is paid out from the bottom of the roll. This yields an almost horizontal pay out of the fabric with very little pitch when the system is deployed.

In the nature of the present invention described herein, the fabric is wound opposite to all conventional systems, and pays out from the top of the roll, thereby providing a much higher degree of pitch on the roof system.

Further, in the nature of the present invention described herein, the fabric is swept clean by the addition of a brush which aides in the removal of debris that could be entrapped in the winding process while stowing the awning. The brush system could also employ a roller mechanism to aide in fabric conveyance.

BRIEF DESCRIPTION OF THE DRAWINGS

The advantages and features of the present invention will be better understood by the following description when considered in conjunction with the accompanying drawings in which.

DETAILED DESCRIPTION

Figure 1:
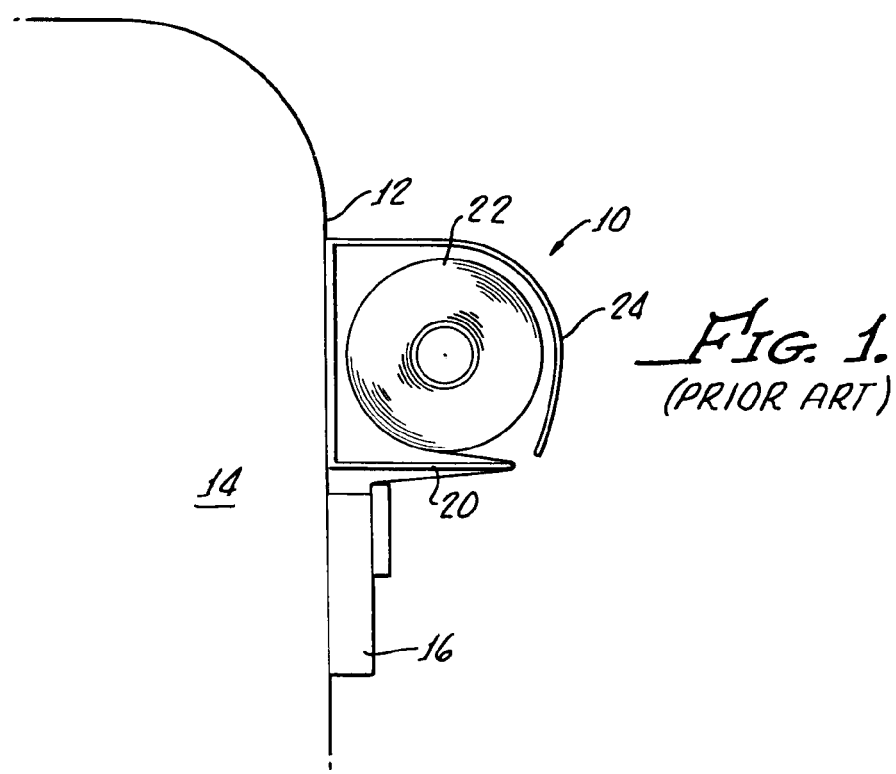
FIGS. 1 and 2 illustrate prior art awning systems showing use with a slider in which the feed of fabric is from a lower edge of an awning housing which does not provide a significant pitch angle.
Figure 2:
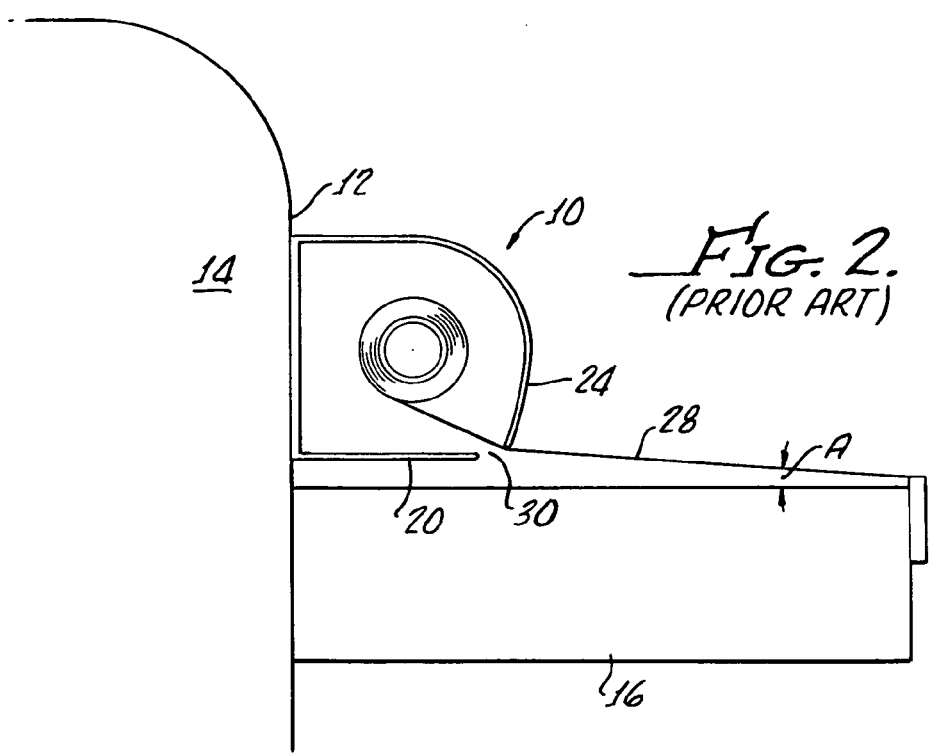

With reference to FIGS. 1 and 2, there is shown a prior art awning system 10 attached to an outside wall 12 of a recreational vehicle 14 having a slider 16. The slider 16 is shown retracted in FIG. 1 and extended in FIG. 2. As shown, the system 10 includes a housing 20 for enclosing an awning roll 22 which is enclosed by a cover 24.

As best illustrated in FIG. 2, upon extension of the slider 16, the feed of the fabric 28 is from a lower edge 30 of the housing 20. This fixes a pitch angle A (See FIG. 2) of the deployed fabric 28 onto an over the slider 16. This small pitch angle A does not facilitate the draining of moisture and debris from the fabric 28 over the slider 16 and in fact enhances a collection of such moisture and debris.

Figure 3:
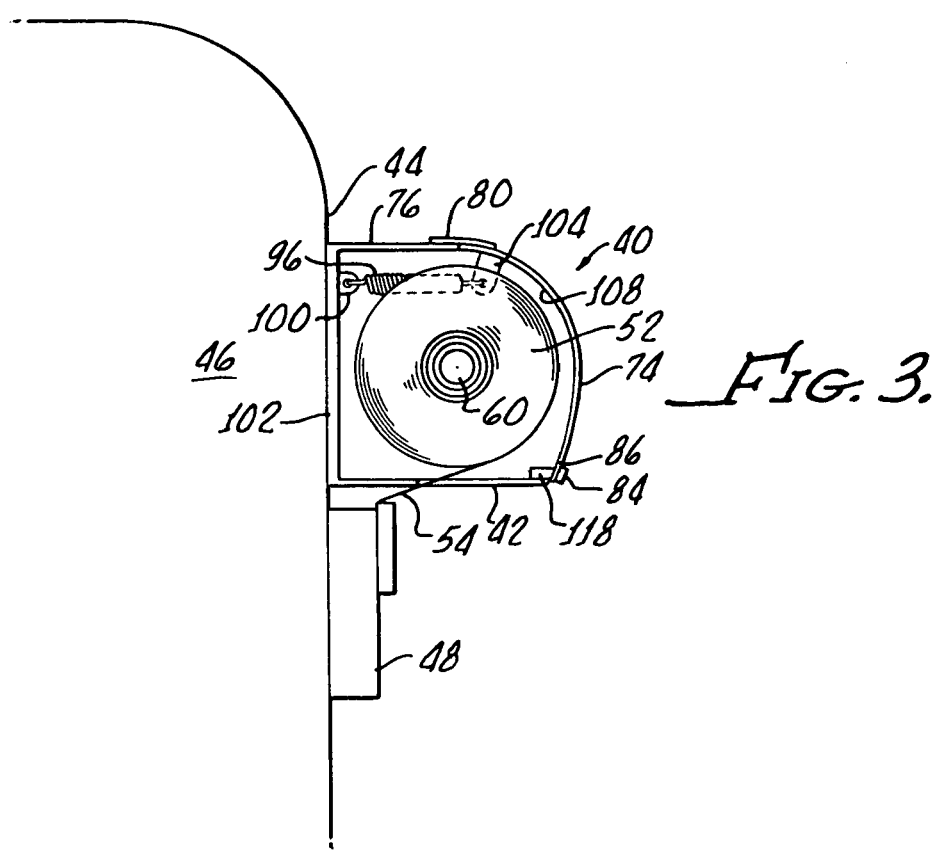
FIG. 3 is a cross sectional view from the awning system in accordance with the present invention generally showing a housing, a roll of awning rotatably disposed within the housing, a cover and a wiper showing a closed cover position with a slider in a retracted position.
Figure 4:
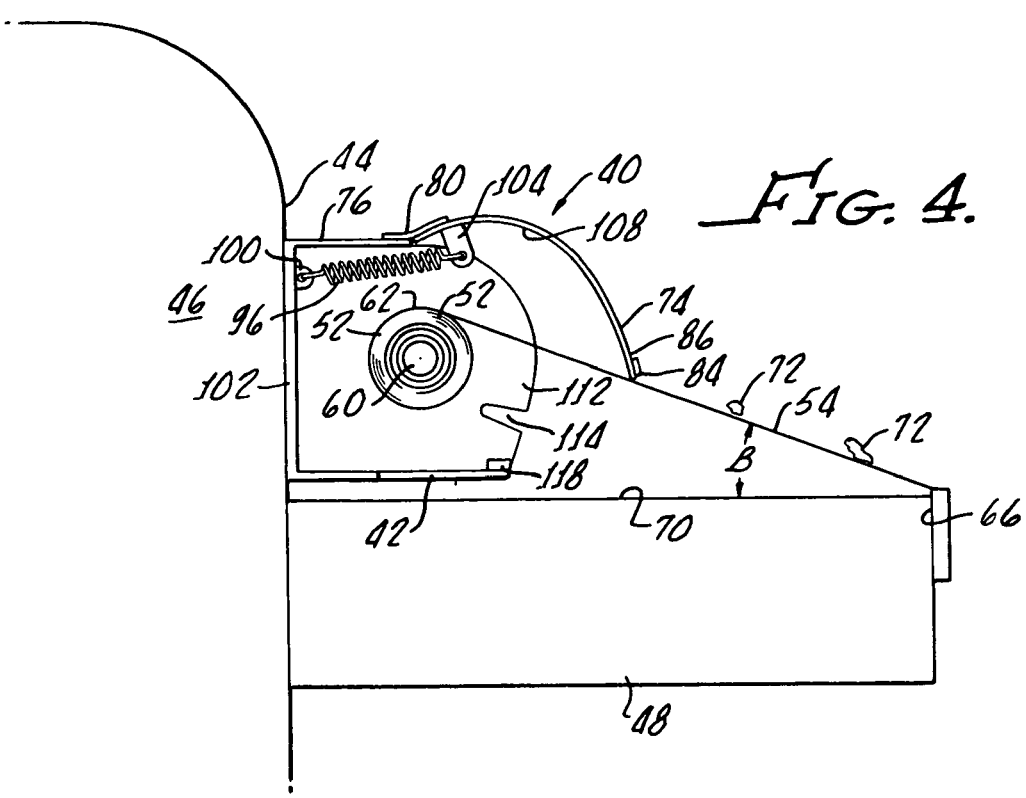
FIG. 4 is a view of the awning system in accordance with the present invention with the slider deployed illustrating a feed of fabric from an upper edge of a roll in order to maintain an enhanced pitched angle of the deployed fabric onto the slider.

With reference now to FIGS. 3 and 4, there is shown a roller awning system 40 in accordance with the present invention which generally includes a housing adapted for mounting on an outside wall 44 of a recreational vehicle 46 having a slider 48. The housing 42 may be attached to the vehicle wall 44 in any conventional manner. A roll 52 of awning 54 is rotatably disposed within the housing 42 on a roller 60 in a conventional manner.

As best illustrated in FIG. 4, the awning roll 52 is wound in order that it may be deployed from a topside 62 of the roll 52 which establishes a pitch B between the roll top 62 and an extended edge 66 of the slider 48 (See FIG. 4).

This enhanced pitch B, being significantly greater than the pitch A established by the prior art, promotes moisture and debris 72 runoff, thus protecting a topside 70 of the slider 48. A cover 74 attached to a top 76 of the housing 42 by a living hinge 80 or other pivotal arrangement (not shown) is provided for enclosing the awning roll 52 with the slider 48 in a retracted position as shown in FIG. 3.

The cover 74 is swingable, as shown in FIG. 4, for enabling a deployment of the awning 54 as the slider 48 is extended. A mechanism (not shown) for extending and retraction of the slider is not part of the present invention.

A wiper 84 is provided at an end 86 of the cover 74 for sweeping debris 90, 92 from the awning 54 as the awning 54 is rolled during retraction of the slider 48. Preferably, the wiper 84 is a brush.

In order to insure brushing contact between the cover 74 and the awning 54 a spring 96 may be provided for biasing the cover 74 onto the awning 52. The spring may be interconnected between a flange 100 on a housing back 102 and a flange 104 on an inside 108 of the cover 74. Other suitable biasing means (not shown) may be utilized.

As best shown in FIG. 4, the housing 42 may include at least one removable side panel 112 preferably including a notch 114 for facilitating a manual removal of the side panel 112, the side panel 112 being removably attached to the housing 42 in any conventional manner.

In addition, as shown most clearly in FIG. 3, a magnet 118 disposed on the housing 42 may be provided for removably holding the cover 74 in a closed position when the slider 48 is retracted.

Although there has been hereinabove described a specific top feeder roller awning system in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A roller awning system for a recreational vehicle, the awning system comprising:
   a slider having an outside edge extendable from an outside wall of said recreational vehicle;
   a housing for mounting on the outside wall of said recreational vehicle above said slider;
   a roll of awning rotatably disposed within said housing and attached to the slider outside edge deployable from a top side of said roll in order to establish a pitch between said top side and the edge of said slider, said pitch promoting moisture and debris runoff;
   a cover attached to said housing for enclosing the awning roll with said slider in a retracted position and swingable for enabling deployment of the awning as the slider is extended; and
   a wiper disposed on a leading edge of said cover for sweeping debris from the awning when the awning is rolled during retraction of said slider.

2. The awning system according to claim 1 said wiper comprises a brush.

3. The awning system according to claim 1 wherein said cover is biased onto the awning.

4. The awning system according to claim 1 wherein said housing comprises at least one removable side panel for enabling replacement of said rod of awning.

5. The awning system according to claim 4 wherein the removable side panel includes at least one notch for facilitating removal of the removable side panel.

6. The awning system according to claim 1 further comprising a magnet latch for removably holding said cover in a closed position.

* * * * *